United States Patent [19]

Taniguti

[11] Patent Number: 4,683,542
[45] Date of Patent: Jul. 28, 1987

[54] VIBRATION MONITORING APPARATUS
[75] Inventor: Ryousuke Taniguti, Nagasaki, Japan
[73] Assignee: Mitsubishi Denki Kabushiki Kaisha, Tokyo, Japan
[21] Appl. No.: 702,411
[22] PCT Filed: Jul. 11, 1984
[86] PCT No.: PCT/JP84/00355
§ 371 Date: Feb. 7, 1985
§ 102(e) Date: Feb. 7, 1985
[30] Foreign Application Priority Data
Jul. 15, 1983 [JP] Japan ................................. 58-130018
[51] Int. Cl.[4] .................... G01H 11/06; G01M 13/00; G06F 15/36
[52] U.S. Cl. ..................................... 364/508; 73/579; 73/602; 73/660; 340/683; 364/550
[58] Field of Search ................ 364/508, 550; 340/683, 340/679; 73/572, 579, 600, 602, 577, 660, 658, 659

[56] References Cited
U.S. PATENT DOCUMENTS
4,184,205 1/1980 Morrow .............................. 364/508

FOREIGN PATENT DOCUMENTS
55-159119 12/1980 Japan .
56-92422 7/1981 Japan .
57-184932 11/1982 Japan ..................................... 73/658
57-203924 12/1982 Japan ..................................... 73/658
58-50434 3/1983 Japan ................................... 364/508
60-18728 7/1983 Japan ..................................... 73/570

Primary Examiner—Felix D. Gruber
Attorney, Agent, or Firm—Leydig, Voit & Mayer

[57] ABSTRACT

A vibration monitoring apparatus for monitoring vibrating conditions of a plurality of rotary machines comprising a signal processor for processing actual data relative to levels of vibrations of the rotary machines and a control processor for storing in memory reference data relative to selected rotational frequencies and corresponding alarm levels for the rotary machines. The vibration waveform of one vibration sensor selected by a scanner is converted by an A/D converter into digital data to be supplied to the signal processor through a shift register. The signal processor is operated under program control to determine the peak-to-peak magnitude of the vibration waveform and compares it with the alarm level provided from the control processor. When the peak-to-peak magnitude of the vibration waveform exceeds the vibration alarm level corresponding to the selected rotary machine, an alarm signal and indicating signals are generated by the control process and sent to output appliances for indicating the vibrating condition thereof.

6 Claims, 4 Drawing Figures

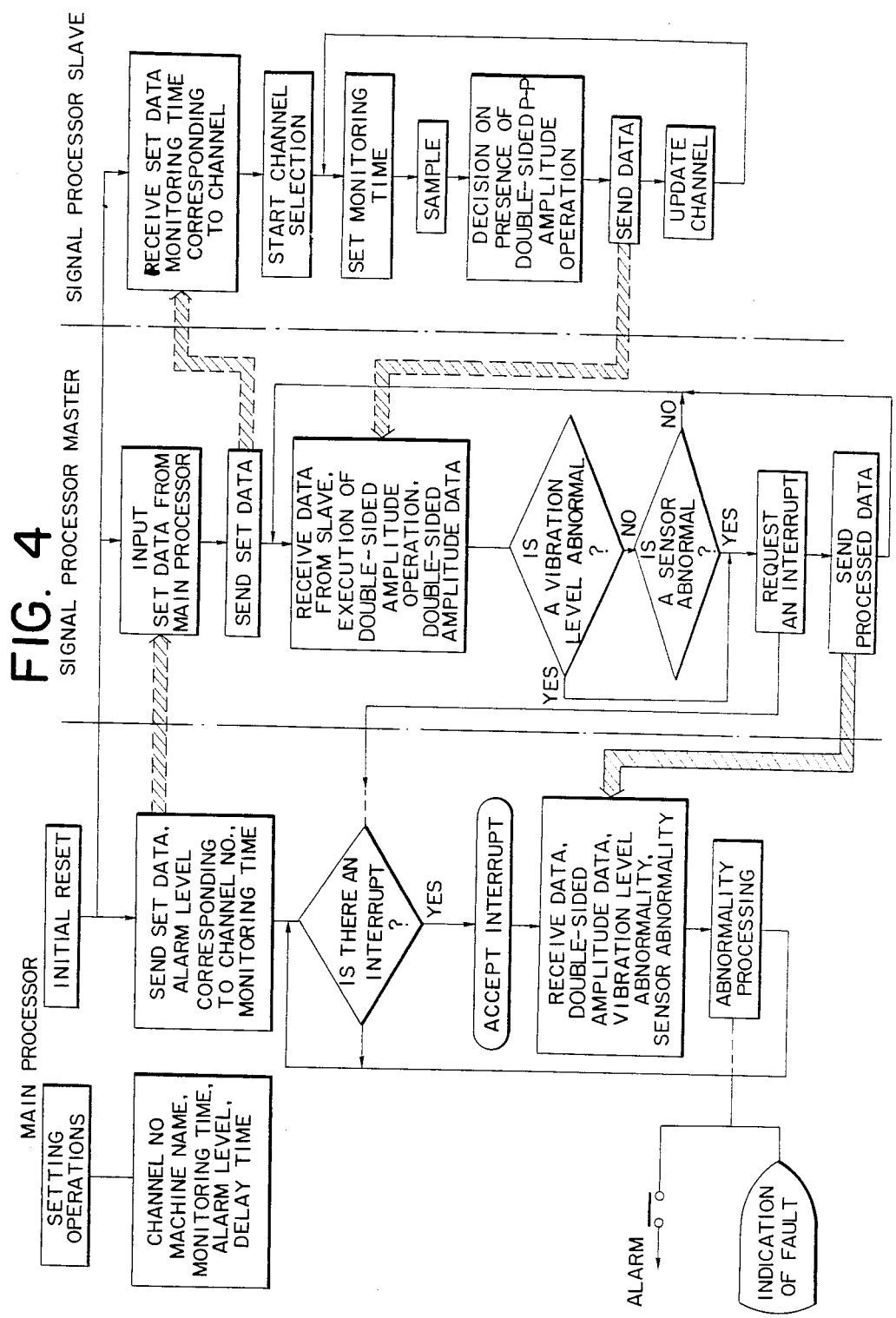

VIBRATION MONITORING APPARATUS

TECHNICAL FIELD

This invention relates to an apparatus which normally monitors the vibrations of a plurality of rotary machines, for example, turbines, dynamos and compressors, and which provides an alarm when any abnormal vibration has arisen.

BACKGROUND ART

Heretofore, vibration monitoring apparatus of this type included a computer wherein a vibration level detected by a vibration detector mounted on a rotary machine or the like is compared with an abnormal vibration level according to the rotational frequency of the rotary machine, and wherein an alarm is given when the vibration level exceeds the abnormal vibration level.

In vibration monitoring apparatus of this type, it is an important factor that the processing of vibration signals detected by a plurality of vibration detectors is performed at high precision and at high speed by a computer system.

DISCLOSURE OF THE INVENTION

This invention provides a vibration monitoring apparatus in which the rotational frequency and vibration alarm level of a rotary member to-be-monitored are stored in memory in advance and sent to a signal processor by a control processor. Vibration data from a vibration sensor is subjected to digital signal processing by the signal processor, and the amplitude value of a vibration waveform is calculated and compared with the vibration alarm level corresponding to the rotational frequency of the rotary member, the apparatus being capable of calculating a vibration level precisely and processing signals at high speed.

According to this invention, a memory is provided for storing rotational frequencies and alarm levels corresponding thereto, whereby vibration monitoring of high precision which conforms to a plurality of rotary machines having different vibration monitoring criteria and rotational frequencies can be performed.

The present invention realizes high speed and high precision owing to a signal processor, and intends a small-sized, less expensive and maintenance-free apparatus.

BRIEF DESCRIPTION OF THE DRAWINGS

FIG. 4 is a general flow chart showing the operation of a vibration monitoring apparatus according to this invention.

BEST MODE FOR CARRYING OUT THE INVENTION

Figure 1:
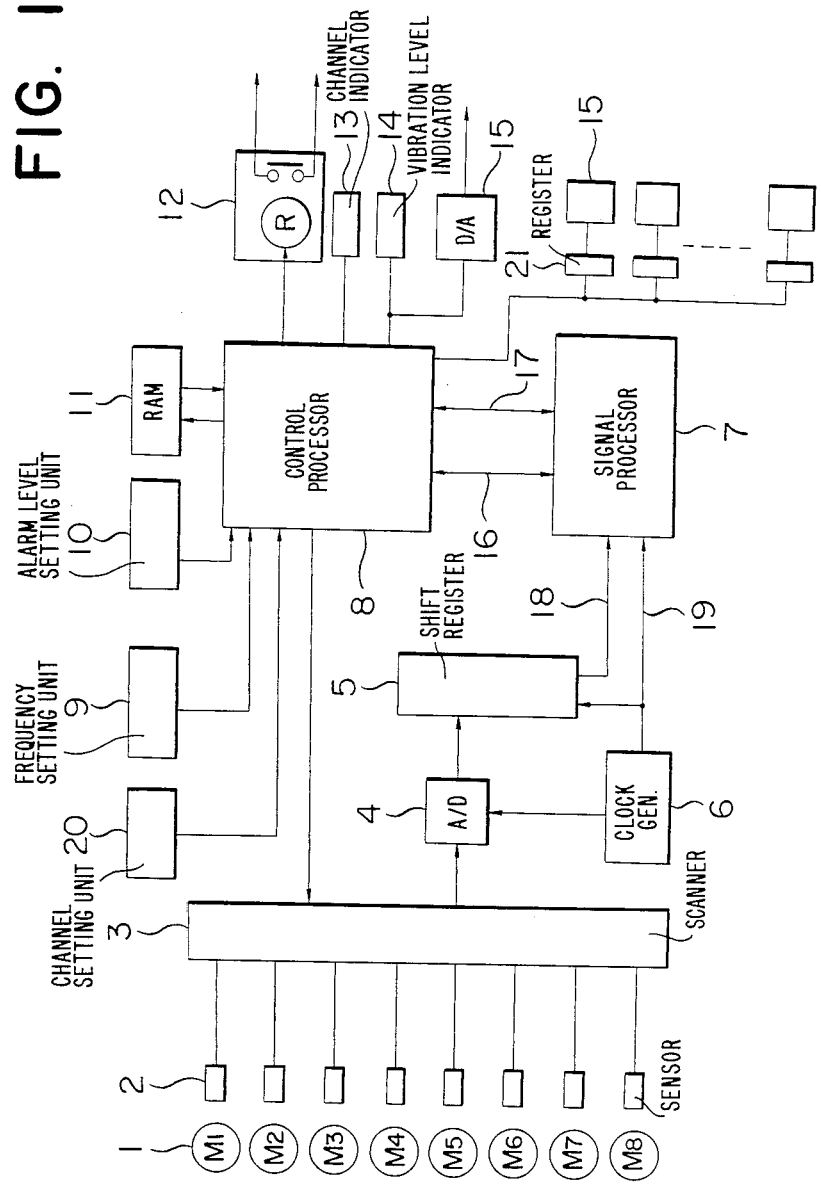
FIG. 1 is a block diagram showing the arrangement of a vibration monitoring system according to an embodiment of this invention.

Now, one embodiment of this invention will be described with reference to the drawings.

In the drawings, 1 designates a plurality of rotary machines $M_1$–$M_8$ to-be-monitored having different rotational frequencies, and 2 vibration sensors which are mounted in correspondence with the shafts of respective rotary meachines and which are usually composed of X-axis sensors and Y-axis sensors positioned in orthogonal directions relative to the axes of the rotary shafts of the rotary machines and to each other. 3 designates a scanner, 4 an A/D (analog/digital) converter, 5 a shift register, 6 a clock generator for starting the A/D converter 4 and for driving the shift register, 7 a signal processor, 8 a control processor, 9 a rotational frequency setting unit, 10 a vibration alarm level setting unit, 11 a nonvolatile RAM (random access memory), 12 an alarm relay, 13 a channel indicator, 14 a vibration level indicator, and 15 a D/A (digital/analog) converter. In addition, 16 denotes the data bus between the control processor 8 and the signal processor 7, 17 a control signal line, 18 a serial data signal line from the shift register 5, 19 a shift clock signal line, 20 a channel setting unit, and 21 registers. The control processor 8 and the nonvolatile RAM constitute a main processor unit; the scanner 3, A/D converter 4, shift register 5, clock generator 6 and signal processor 7 constitute a signal processor unit; and the alarm relay 12, channel indicator 13, vibration level indicator 14, D/A converters 15 and registers 21 constitute an output unit. Besides, the rotational frequency setting unit 9, vibration alarm level setting unit 10, and channel setting unit 20 constitute a keyboard for inputting data pertaining to the setting operation, such as the channel numbers, rotational frequencies, monitoring time, alarm level, and delay time.

Next, the operation will be explained. Rotational frequencies and vibration alarm level for respective rotary machines to-be-monitored are stored from the rotational frequency setting unit 9 and vibration alarm level setting unit 10 into the nondestructive RAM 11 through the control processor 8. The control processor 8 supplies the signal processor 7 with the rotational frequency and vibration alarm level of a first channel set in the channel setting unit 20, and selects the scanner 3 at the first channel. The vibration waveform of the first channel selected in the scanner 3 is applied to the A/D converter 4. The channels of the scanner 3 are correspondingly provided in accordance to the number of the vibration sensors 2. The A/D converter 4 is started by the clock generator 6 to subject the output of the scanner (3) to A/D conversion with a sampling period determined by the sample time or period of the vibration waveform of the rotary machine. Each time the A/D conversion is performed, digitized vibration data is applied to the signal processor 7 through the shift register 5. The signal processor 7 continuously receives such items of data every predetermined number of sampling periods corresponding to a sampling to determine the average thereof. These sampling averages at different time instants during the sample time are compared to each other to determine a maximum and a minimum vibration amplitude value corresponding to a peak-to-peak level of the vibration waveform of the first channel in that sample time. This peak-to-peak level is compared with the vibration alarm level stored in the nonvolatiel RAM. When the vibration amplitude value is higher than the alarm level, a flag is set, and data is sent to the control processor 8 along with the vibration amplitude value.

Figure 2:
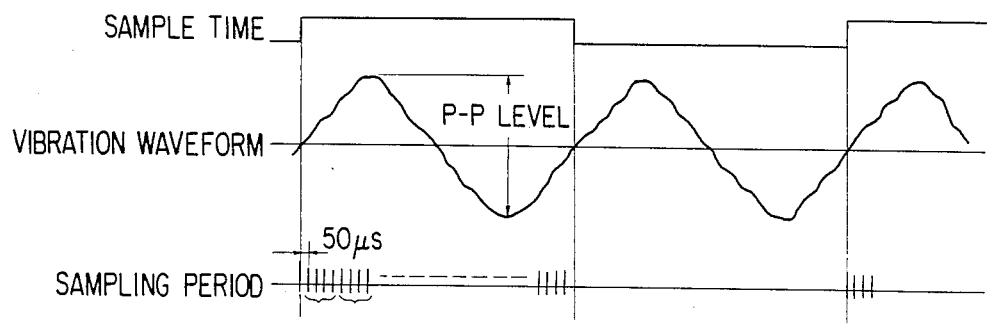
FIG. 2 is a signal waveform diagram showing several signals for calculating the amplitude value of a vibration waveform in the system of FIG. 1.
Figure 3:
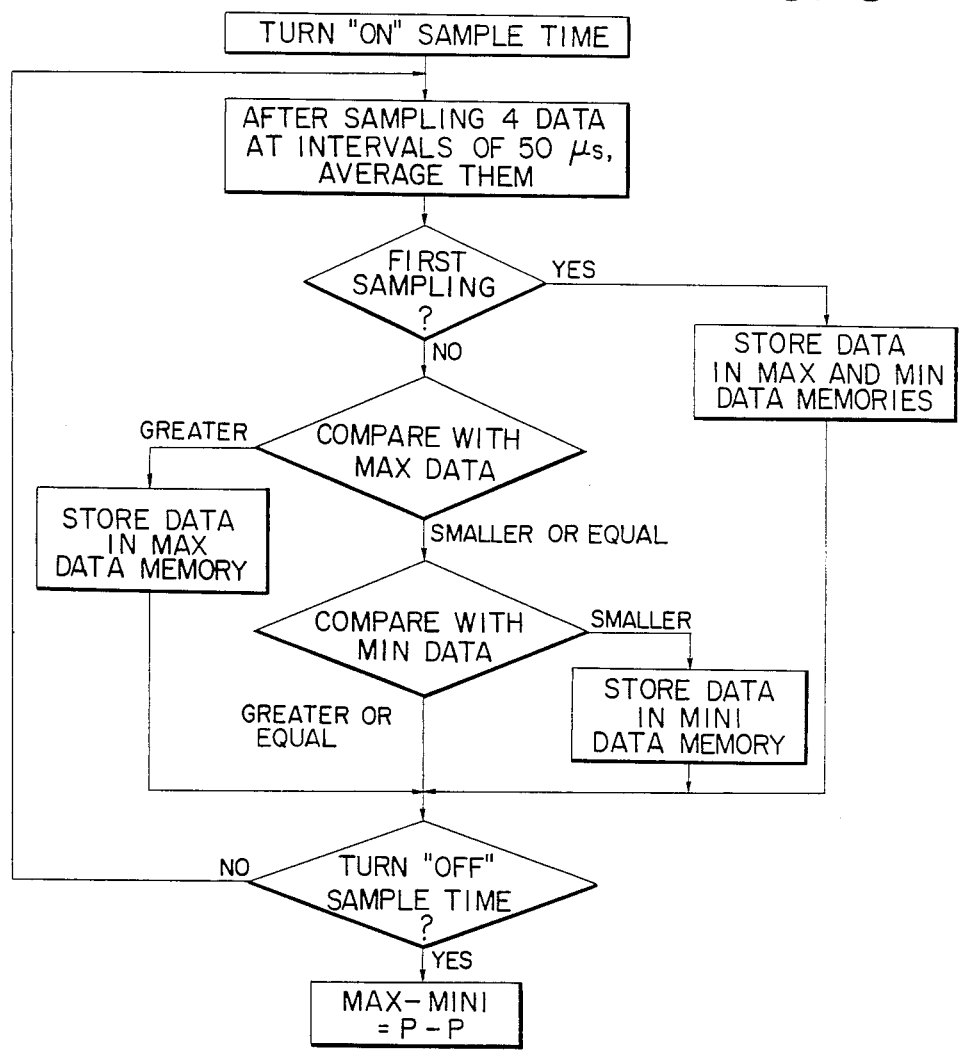
FIG. 3 is a flow chart showing an algorithm for calculating the double sided amplitude value of the vibration waveform in the system of FIG. 1.

FIG. 2 shows a vibration waveform from the sensor 2, and a sampling period and a sample time of the scanner 3. FIG. 3 illustrates a calculating algorithm for finding the doubled-sided amplitude value (peak-to-peak) of the vibration waveform. Here, the sample time is determined by an operation from the sensor 3 and the number of channels employed and a sampling period is set at 50 μsec. As shown in FIG. 3, the first four digitized vibration data provided by the A/D converter 4 are averaged to provide a first sampling value to be stored as the maximum and minimum data in the temporary memory of the shift register 5. The next four digitized vibration data are averaged and compared with the maximum and minimum data stored in the temporary memory. If this average is greater than the maximum data, it replaces the maximum data and is stored in the temporary memory as a new maximum data. On the other hand, if this average is smaller than or equal to the maximum data, it is then compared with the minimum data currently stored in the temporary memory. If this average is smaller than the minimum data, it replaces the minimum data and is stored in the temporary memory as a new minimum data. This operation is continuously performed for the entire sample time to determine the peak-to-peak level of the vibration waveform in that period. It is noted that when the rotatry machine produces no vibration, a D.C, input vibration waveform is produced and, as a result, the peak-to-peak level is zero.

The control processor 8 receives the data and stores the status. The operations are performed similarly for all the other channels. When an alarm has occurred after the operations for all the channels, the corresponding channel and vibration level value are indicated on the channel indicator 13 and vibration level indicator 14, and the alarm relay 12 is energized. If necessary, further alarm relays and channel indicators can be added and used as succeeding alarm relays. Besides, when the vibration levels of all the channels are to be recorded by a recorder or the like, the registers 21 and D/A converters 15 are disposed for the respective channels.

FIG. 4 shows a general flow chart in the case of executing the alarm processing of the vibration monitoring apparatus in this invention. In the block of "Decision of Presence of double-sided (P-P) Amplitude Operation" in FIG. 4, the operations are executed in accordance with the flow chart shown in FIG. 3. As shown in FIG. 4, the main control processor 8 performs both the setting operations and the abnormality processing. In the setting operations, the control processor receives information provided from an external source to control the channel number and machine name assignments as well as the settings of monitoring time, alarm level, and delay time for respective machines. On the other hand, in the abnormality determining process, the main control processor 8 receives double-sided vibration amplitudes of vibration waveforms, which are processed and sent from the signal processor master portion to determine abnormality. Upon this determination, the main control processor generates an alarm and an indication of fault indicating the occurrence of abnormality. The operations of the signal processor 7 are divided into a master and a slave portion which interact with each other. The master portion receives set data from the main control processor 8 and data from the slave portion to execute the double-sided amplitude determination operation and send processed data to the main processor. The slave portion relies on set data sent from the master portion to determine the presence of such double-sided amplitude determination operation and continuously update the data of the selected channel.

In this manner, the rotational frequencies and alarm levels are set for the respective machines to-be-monitored and stored in the nonvolatile RAM. The signal processor calculates the peak-to-peak magnitude of the vibration waveform during a time corresponding to one revolution of the machine so as to send the control processor a vibration value to be compared with the alarm level stored in the RAM to generate an alarm if needed. The control processor controls the indication of the contents and the sounding of the alarm, and such operations are serially performed for all the channels for which an alarm is provided, whereby a vibration monitoring system for a plurality of machines which ensures high speed and high precision can be provided.

While, in the above embodiment, the occurrence of an abnormality has been indicated for only one channel, a plurality of abnormalities can also be indicated as needed.

By additionally providing the alarm relays, succeeding alarms can be provided when a plurality of machines have undergone abnormalities. On this occasion, the channel indicators are also added.

Further, while the embodiment has corresponded to the plurality of rotary machines, the invention is also applicable to an identical rotating system. The invention is also applicable to a signal channel so that the scanner can be removed.

While the embodiment has been furnished with the channel indicator, the vibration level indicator, etc., they may well be replaced with a graphic display device such as CRT.

As set forth above, according to this invention, a control processor provides functions for setting and storing alarm levels and rotational frequencies, outputting an alarm and indicating a vibration level, while a signal processor provides functions for instantaneously digitizing the vibration waveform, so high speed and high precision are attained. Furthermore, serial monitoring of a plurality of rotary machines is also permitted, whereby reductions in size and cost can be realized, and the reliability is enhanced.

INDUSTRIAL APPLICABILITY

This invention is applicable to an apparatus normally monitoring the vibrations of rotary machines such as a turbine, a dynamo and a compressor.

What is claimed is:

1. A vibration monitoring apparatus for monitoring vibrating conditions of a plurality of rotary machines comprising a rotational frequency setting unit for setting rotational frequencies of respective rotary machines, an alarm level setting unit for setting alarm vibration level values of corresponding rotary machines, a nonvolatile memory for storing set values provided by said rotational frequency setting unit and said alarm level setting unit, a vibration sensor receiving oscillation signals generated by the rotary machines to detect vibrations thereof, signal processing means operated under program control for determining vibration amplitude values corresponding to the vibrations of respective rotary machines, a control processor supplying the set values provided by said rotational frequency setting unit and said alarm level setting unit to said processing means, said processing means including means for comparing the alarm vibration level values set for the respective rotary machines and for generating an output each time one of the vibration amplitude values is greater than one of the alarm vibration level values of the corresponding rotary machine, said control processor including means responsive to the output generated by said processing means for generating alarm and indicating signals corresponding to the output from said processing means, and output means receiving the alarm and indicating signals from said control processor and indicating vibrating conditions of said rotary machines.

2. A vibration monitoring apparatus as defined in claim 1 wherein said apparatus includes a plurality of vibration sensors and said signal processing means further comprises a vibration sensor selecting scanner for sequentially scanning to receive vibration waveforms from respective vibration sensors corresponding to vibration conditions of the rotary machines, an A/D converter for converting into digital data the vibration waveforms from said vibration sensors, a shift register for storing digital data converted by said A/D converter, and wherein said control processor means further comprises a channel setting unit for setting a sequence to be supplied to said vibration sensor selecting scanner for sequentially scanning said vibration sensors, said control processor supplying said signal processor means with the selected rotational frequencies and alarm vibration level values of corresponding rotary machines for which vibration data is simultanteously supplied from the vibration sensors through the action of said vibration sensor selecting scanner.

3. A vibration monitoring apparatus as defined in claim 2 wherein said plurality of vibration sensors are respectively disposed in correspondence with a plurality of rotary machines having different rotational frequencies.

4. A vibration monitoring apparatus as defined in claim 2 wherein a said plurality of vibration sensors are disposed in different places of a single rotary machine.

5. A vibration monitoring apparatus for monitoring vibration conditions of a plurality of rotary machines, said monitoring apparatus comprising:
control processor means having input means for storing data in memory relative to selected rotational frequencies and corresponding alarm levels for the plurality of rotary macines, and
signal processor means receiving actual data relative to vibrations generated by the plurality of rotary machines, comparing the actual data with the selected data stored in memory, and producing indications of levels of vibration of the rotary machines from the comparison.

6. A vibration monitoring apparatus as defined in claim 5 wherein said control processor means includes a rotational frequency setting unit for setting data relative to selected rotational frequencies of respective rotary machines in memory, an alarm level setting means for setting data relative to alarm vibration level values of corresponding rotary machines in memory, and wherein said signal processor means includes vibration sensors for detecting vibrations of the respective rotary machines, determining the magnitudes of the amplitudes of the vibrations of the respective rotary machines and providing signals representative thereof, and a signal processor providing actual data based on the magnitudes of the vibration amplitudes of the rotary machines, and comparing the actual data with the selected data stored in the memory, and
further including output means responsive to the comparison by the signal process including indicators providing indications of vibration amplitude values representing vibration conditions of said rotary machines and further including alarm signals actuated upon actual vibration values exceeding selected alarm levels.

* * * * *